(12) United States Patent
Mathews et al.

(10) Patent No.: US 9,868,082 B2
(45) Date of Patent: Jan. 16, 2018

(54) PORTABLE AIR FILTRATION UNIT

(71) Applicant: Abatement Technologies, Inc., Suwanee, GA (US)

(72) Inventors: Lynette Ravile Mathews, Atlanta, GA (US); Blair Lawrence Harber, St. Davids (CA)

(73) Assignee: Abatement Technologies, Inc., Suwanee, GA (US)

( * ) Notice: Subject to any disclaimer, the term of this patent is extended or adjusted under 35 U.S.C. 154(b) by 420 days.

(21) Appl. No.: 14/063,716

(22) Filed: Oct. 25, 2013

(65) Prior Publication Data

US 2015/0113924 A1  Apr. 30, 2015

(51) Int. Cl.
*B01D 46/00* (2006.01)
*B01D 46/42* (2006.01)
*B01D 46/12* (2006.01)

(52) U.S. Cl.
CPC ..... *B01D 46/0002* (2013.01); *B01D 46/0024* (2013.01); *B01D 46/12* (2013.01); *B01D 46/4227* (2013.01); *B01D 2273/30* (2013.01)

(58) Field of Classification Search
CPC ............ B01D 46/0002; B01D 46/4227; B01D 46/0024; B01D 46/12; B01D 46/00; B01D 46/42; B01D 2273/30; B01D 46/04; A47L 5/00–5/38; A47L 7/00–7/08; A47L 9/00–9/327; A47L 11/00–11/4097; A47L 13/00–13/62
USPC .............................. 55/357, 471, 385.1–385.8
See application file for complete search history.

(56) References Cited

U.S. PATENT DOCUMENTS

| | | | | |
|---|---|---|---|---|
| 2,414,564 | A | * | 1/1947 | Silverman .......... B01D 46/0075 55/305 |
| 3,966,442 | A | * | 6/1976 | Waters .................. B01D 53/02 131/231 |
| 4,133,658 | A | * | 1/1979 | Callewyn ............... B01D 45/12 15/314 |
| D287,274 | S | | 12/1986 | Crowley et al. |
| 4,633,769 | A | * | 1/1987 | Milks ...................... F24F 7/025 454/117 |
| 5,034,036 | A | * | 7/1991 | Creek .................. F02M 35/022 180/68.3 |
| 5,478,379 | A | * | 12/1995 | Bevins ............... B01D 46/0031 55/356 |
| D374,479 | S | | 10/1996 | Bucher et al. |
| D374,480 | S | | 10/1996 | Micoley |
| D376,419 | S | | 12/1996 | Seaman et al. |

(Continued)

OTHER PUBLICATIONS

The Predator® 600 Portable Air Scrubber, available to Applicants at least as early as Oct. 24, 2013.

(Continued)

*Primary Examiner* — T. Bennett McKenzie
(74) *Attorney, Agent, or Firm* — Kilpatrick Townsend & Stockton LLP (57) ABSTRACT

A stackable, portable air filtration unit utilizing a molded plastic central housing, injection-molded plastic inlet and outlet covers and accommodating a high-efficiency particulate air ("HEPA") filter or other high efficiency particulate filter, a secondary filter and a pre-filter. The unit is versatile and flexible in that different motorized impellers can be used alternatively, depending on the desired specifications.

20 Claims, 7 Drawing Sheets

(56) References Cited

U.S. PATENT DOCUMENTS

| | | | |
|---|---|---|---|
| 5,730,282 A * | 3/1998 | Bureau | A45C 9/00 190/11 |
| D394,099 S | 5/1998 | Tsuji | |
| D395,492 S | 6/1998 | Phillips et al. | |
| 5,766,316 A * | 6/1998 | Gates | B01D 46/0002 55/385.6 |
| D418,591 S | 1/2000 | Birdsell et al. | |
| D449,676 S | 10/2001 | Mulvaney et al. | |
| D459,456 S | 6/2002 | Campbell | |
| 6,494,940 B1 * | 12/2002 | Hak | A61L 9/16 55/471 |
| 6,648,937 B1 * | 11/2003 | Nguyen | B01D 45/00 126/299 R |
| D500,847 S | 1/2005 | Manke et al. | |
| D532,879 S | 11/2006 | Ching | |
| D548,314 S | 8/2007 | Huang | |
| D572,355 S | 7/2008 | Gao | |
| D582,531 S | 12/2008 | Israel et al. | |
| D591,412 S | 4/2009 | Rittri et al. | |
| D594,102 S | 6/2009 | Israel et al. | |
| D597,186 S | 7/2009 | Campbell et al. | |
| D597,187 S | 7/2009 | Campbell | |
| D597,640 S | 8/2009 | Israel | |
| D611,134 S | 3/2010 | Borgi | |
| D626,641 S | 11/2010 | Ediger et al. | |
| D654,578 S | 2/2012 | Ediger et al. | |
| 2002/0104296 A1 * | 8/2002 | Cook | F04C 29/026 55/319 |
| 2002/0104437 A1 * | 8/2002 | Peteln | B01D 45/10 95/211 |
| 2002/0173265 A1 * | 11/2002 | Kipka | H05K 9/0041 454/184 |
| 2007/0144119 A1 * | 6/2007 | Bauer | F24F 3/1603 55/385.2 |
| 2010/0275900 A1 * | 11/2010 | Bain | F24C 15/20 126/299 E |
| 2013/0312451 A1 * | 11/2013 | Max | F28D 1/05333 62/498 |
| 2014/0150488 A1 * | 6/2014 | Black | F24F 3/14 62/404 |

OTHER PUBLICATIONS

DRI-EAZ® Owners Manual DefendAir® HEPA 500 Air Scubber 115v Model, available to Applicants at least as early as Oct. 24, 2013.

DRI-EAZ® Air Filtration Hepa 500, available to Applicants at least as early as Oct. 24, 2013.

Office Action, Design U.S. Appl. No. 29/470,891, dated Mar. 27, 2015.

\* cited by examiner

PORTABLE AIR FILTRATION UNIT

FIELD OF THE INVENTION

This invention relates to air filtration to remove hazardous and/or non-hazardous particulate, biological, and gas phase contaminants, and in some instances to create and maintain negative or positive atmospheric pressure within physically enclosed areas.

BACKGROUND

Devices that pass air and other fluids through one or more filters are well known and have long been used. Such devices are also well known for use during abatement of aerosolized contaminants in buildings, where the air in a particular area may contain airborne materials that need to be removed from the air before they either settle onto surfaces or can escape in air exhausted from that area and potentially breathed by facility occupants outside the area or for other reasons.

The design of such filtration units or "portable air scrubbers" is challenging because there are a large number of demanding requirements and desired features, some of which compete with each other. For instance, it is desirable that such air scrubbers be compact, lightweight, stackable, easily transported, powered, operated, maintained, cleaned and stored. It is desirable that they be durable and able to function in numerous different environments, as well as economical to purchase and operate. It is desirable for such scrubbers to utilize multiple, economical filters and to be highly effective.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The portable air filtration unit of this invention utilizes a double walled molded housing with inlet and outlet doors or covers, a pre-filter, a secondary filter and a high-efficiency final filter, typically a "HEPA" High Efficiency Particulate Air filter, a motorized impeller to draw or drive air through the filters, and appropriate controls. It is compact, lightweight, durable, economical to operate, versatile and flexible in that different motorized impellers can be used alternatively, depending on the desired specifications.

BRIEF DESCRIPTION OF THE DRAWINGS

Illustrative embodiments of the present invention are described in detail below with reference to the following drawing figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
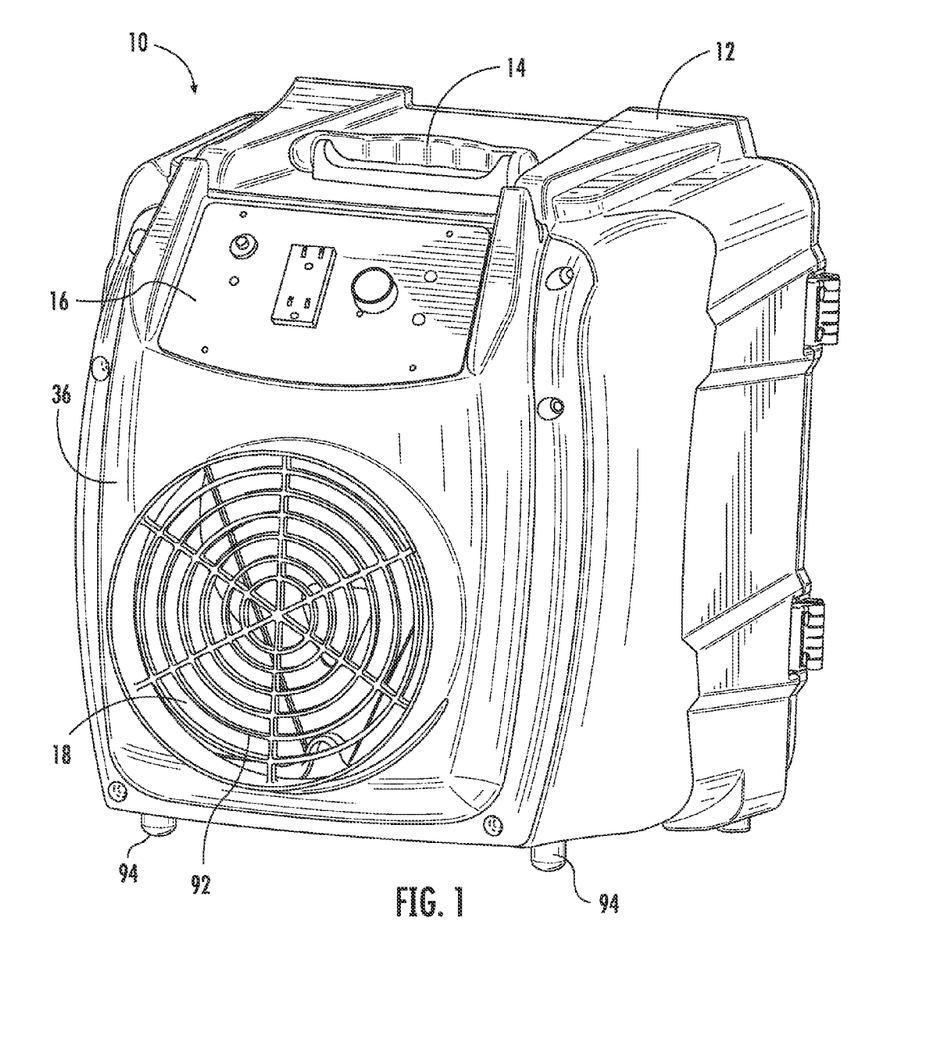
FIG. 1 is a perspective view of the front, top and right side of the portable air filtration unit of this invention.

FIG. 1 depicts one embodiment of the portable air filtration unit 10 of this invention having a housing 12 to which a carrying handle 14 is attached, together with a sloping control panel 16 and an air exhaust 18. Handle 14 may be foldable to provide a low profile when the handle is not in use, it may be ergonomically designed to promote comfort in use, and it may be positioned on housing so that the unit 10 is balanced and does not tilt when lifted by the handle 14.

Figure 2:
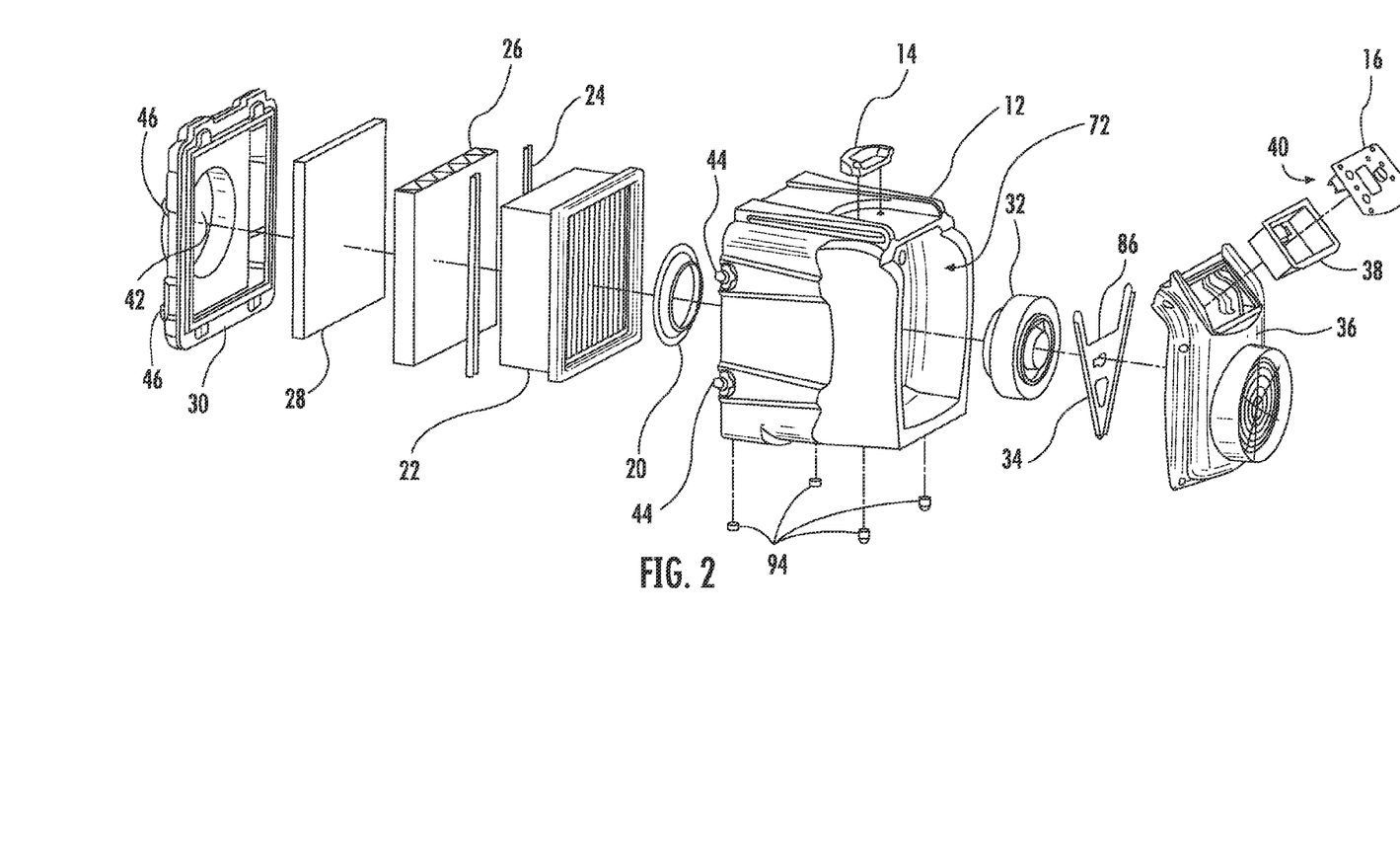
FIG. 2 is an exploded perspective view of the left side of the unit depicted in FIG. 1.

These major components and their relationships may be easily seen in FIG. 2, which is an exploded perspective view in which the housing is centrally positioned. To the left of the housing 12 are a venturi ring 20, high-efficiency filter 22, high-efficiency filter securing brackets 24, secondary filter 26, pre-filter 28 and inlet door 30.

To the right of the housing 12 in FIG. 2 may be seen a motorized impeller 32, motor mount 34, outlet cover 36, control panel box 38 and control panel assembly 40, which includes control panel 16.

When these components are assembled, inlet door 30 permits entry of unfiltered air through inlet 42, which is drawn in and through the pre-filter 28, secondary filter 26 and high-efficiency filter 22 by motorized impeller 32. When closed, inlet door 30 also secures filters 28 and 26 in their appropriate places and seals against housing 12 with latch and keeper, one side 44 of which are attached to housing 12 and the other sides 46 of which are attached to inlet door 30. A pair of hinges on the opposite side affix door 30 to housing 12. This sealing engagement between inlet door 30 and housing 12 insures that air drawn into housing 12 must pass through the three filters 22, 26 and 28. This sealing engagement may be particularly well appreciated by reference to FIG. 3, which shows the door 30 open with pre-filter 28 seated in a like-shaped cavity on the inner side 50 of inlet door 30. This customized cavity prevents any significant air flow to bypass pre-filter 28 as can happen with some air filtration units. Pre-filter 28 is surrounded by a raised boss 48, contoured to match the filter side recess in housing 12, which is generally rectangular and has two tabs 52 extending up and two tabs 53 extending down from the rectangular portion 54 of raised boss 48. Housing 12 has a generally rectangular recess 56 with upward facing 58 and downward facing 60 tab-receiving recesses.

Secondary filter 26 seats in the generally rectangular recess 56 and, with inlet door 30 open, filter 26 can be removed by reaching into one or more of recesses 58 or 60 to engage one of the upper or lower edges of filter 26. When closed, the raised boss 48 and tabs 52, 52 of inlet door 30 seat in rectangular recess 56 and recesses 58 and 60 providing an air seal around the periphery of door 30. Air sealing between inlet door 30 and housing 12 (and between housing 12 and outlet cover 36) may be facilitated by use of a continuous gasket (such as a closed cell foam or other gaskets) stead in a customized perimeter groove that follows the contour of raised boss 48. Among other places, such a gasket may be positioned at the intersection 31 of boss 48 and the inner side of inlet door 30 (see FIG. 3). Other types of gaskets and other gasket locations may also be used.

Figure 3:
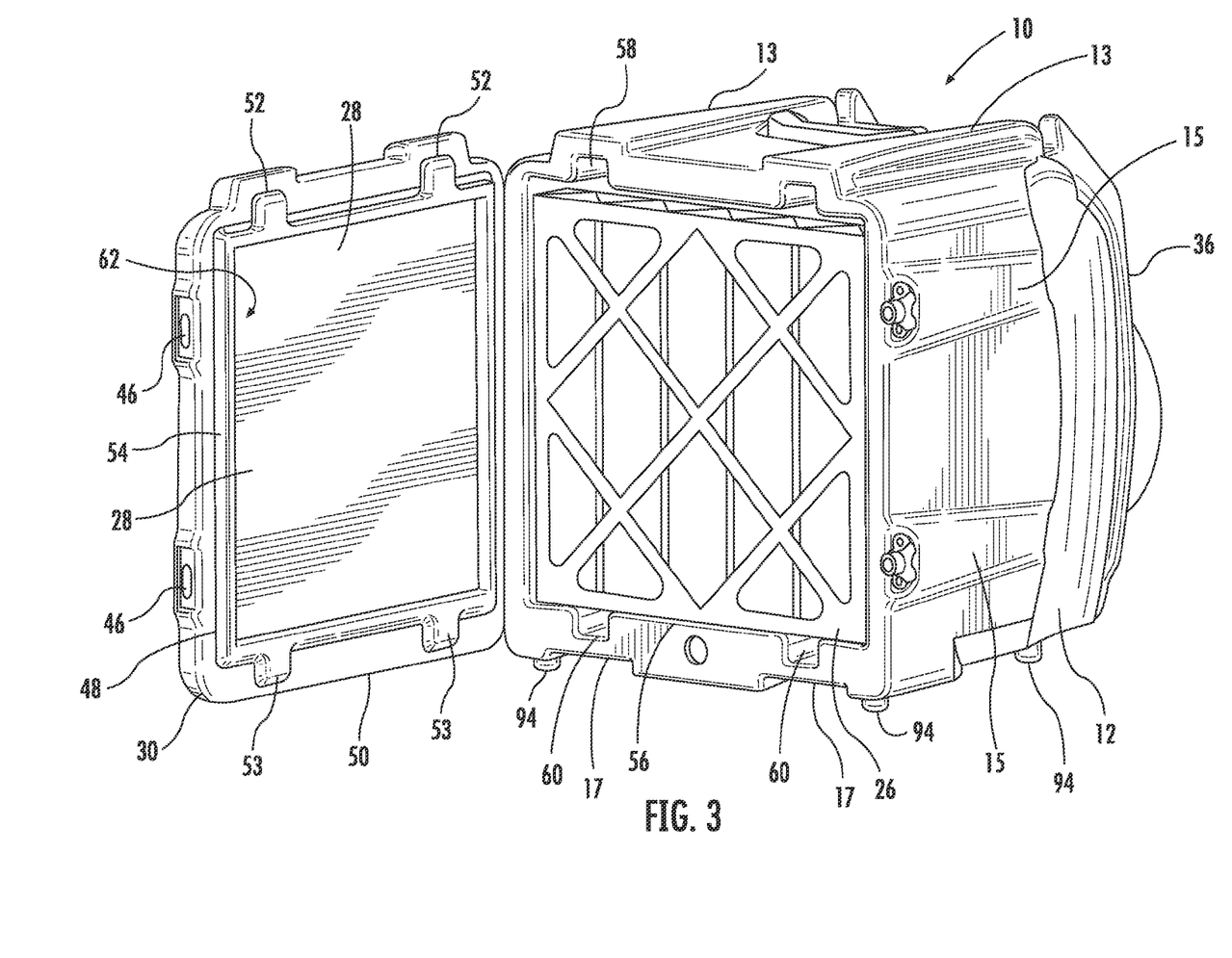
FIG. 3 is a perspective view of the inlet side of the unit depicted in FIG. 1 with the inlet door open.

A recess 62 in inlet door 30 defined by rectangular portion 54 of the inward facing inlet door 30 boss is sized to receive a snugly-fitting pre-filter 28, which typically may be batting material of entangled natural or synthetic fibers approximately 1" thick.

Secondary filter 26 may typically be a pleated filter of synthetic media blend fibers within a rigid or semi-rigid paper board frame (known as a beverage board frame).

Figure 4:
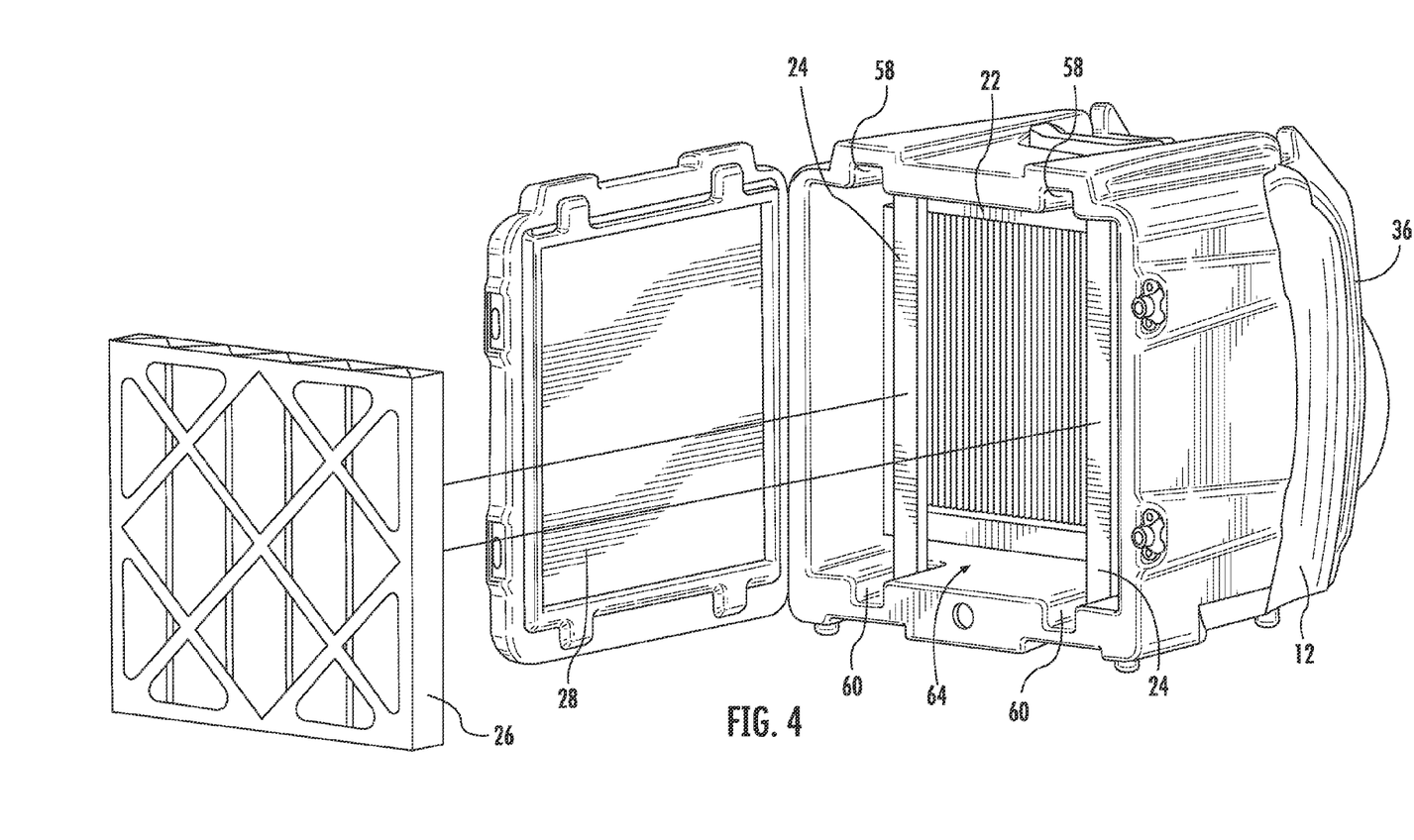
FIG. 4 is a perspective view of the unit depicted in FIG. 1 with the inlet door open and the secondary filter removed.
Figure 5:
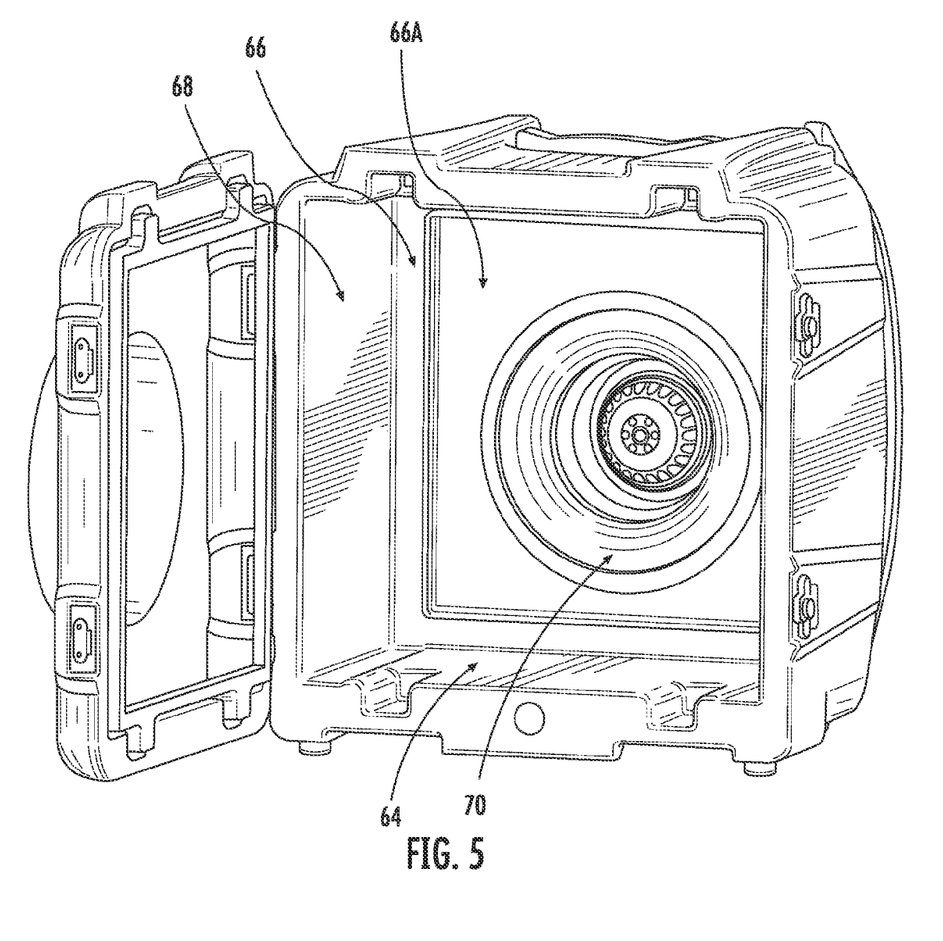
FIG. 5 is another perspective view of the unit depicted in FIG. 1 with the inlet door open and without any filters.

As may be appreciated from FIGS. 4 and 5, opposed pairs of the recesses 58 and 60 in housing 12 receive the two ends of high-efficiency filter securing brackets 24. The depicted brackets 24 may be sections of square or rectangular cross-section tubing, channel, such as C-shaped, L-shaped or other cross-section channel, or a wide variety of other elongated structures including metal strap, rod or bar stock. The recesses 58 and 60 extend into housing 12 so that brackets 24 fully seated in pairs of recesses 58 and 60 hold high-efficiency filter 22 in its intended position in the housing 12 and may be secured, among other ways, by screws, pins, bolts or other fasteners that pass through bracket 24 ends and into housing 12 or into suitable fittings attached to housing 12 such as threaded metal inserts. Brackets 24 also separate secondary filter 26 from high-efficiency filter 22 a distance equal to the thickness of brackets 24.

The tuck-in place fit of pre-filter 28 in the inlet door cavity allows for easy access to the interior of housing 12 by opening inlet door 20, and the easy replacement of high-efficiency filter 22 simply by removing the secondary filter 26 and bracket bars 24. As such, it is easy to replace any or all of the three stages of filtration consisting of pre-filter 28, secondary filter 26 and high-efficiency filter 22.

As is visible in FIG. 5, the filter-receiving cavity 64 in housing 12 is bounded, in part, by a flat, smooth baffle wall 66 designed as a high-efficiency sealing surface that faces high-efficiency filter 22 (when in place) and is framed by rectangular frame 68. Additional recessed wall 66A beyond surface 66 is structurally sized to create a transitional airflow plenum. This cavity also allows for plumbing a port for differential pressure sensing. This surface also contains multiple seating surfaces to accommodate different sized venturi plates. Both baffle wall 66, recess 66A, and frame 68 are integrally formed as part of housing 12 when housing 12 is molded of plastic material as depicted in the figures.

A round opening 70 is centered in wall 66, and the venturi ring 20 is attached to the periphery of that opening to channel and increase the velocity of air drawn through opening 74. The venturi ring 20 depicted in the figures is of relatively small diameter, but a larger-diameter venturi ring can also be used, if desired, typically with a higher capacity motorized impeller.

Figure 6:
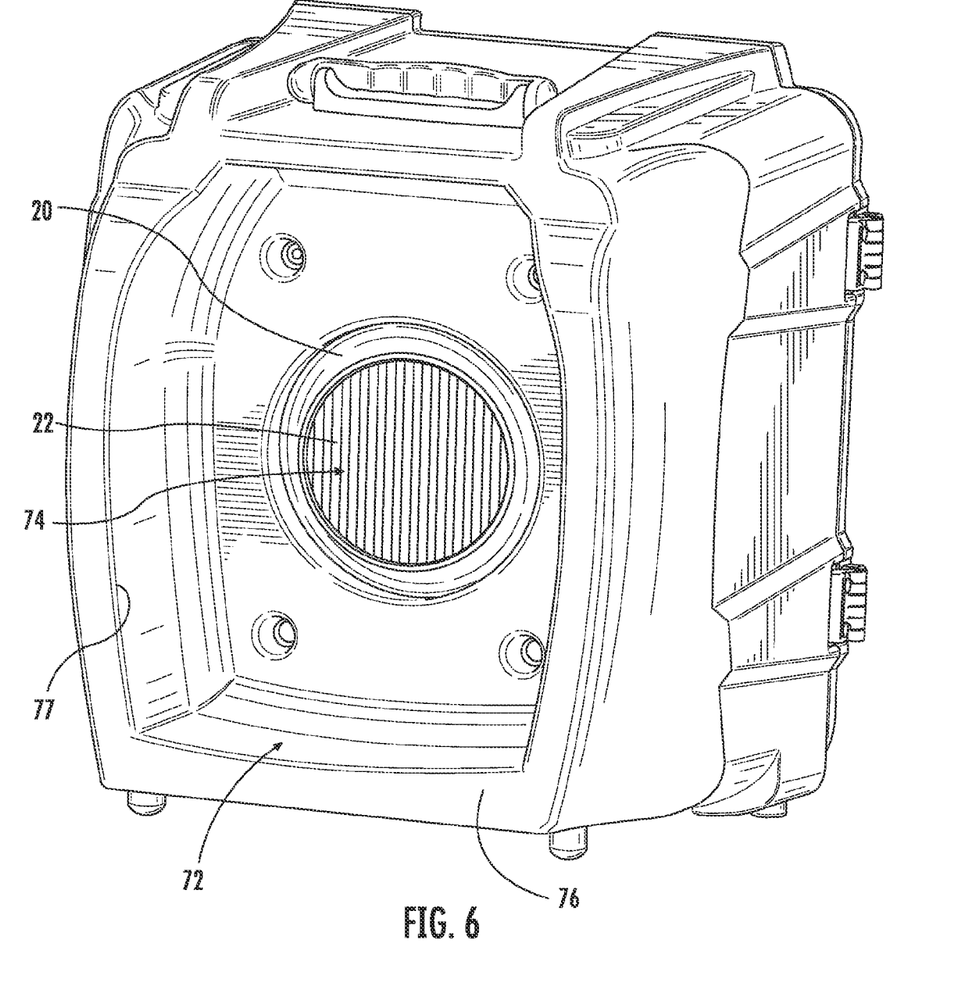
FIG. 6 is a perspective view of the outlet side or end of the unit depicted in FIG. 1 without the outlet cover.

As is visible in FIGS. 2 and 6, housing 12 defines an impeller cavity 72 on the opposite side of wall 66 from the filter-receiving cavity 64. The motorized impeller 32 is positioned within impeller cavity 72, together with the control panel box 38, both of which are attached to outlet cover 36, which is secured to housing 12 with screws, bolts, pins or other fasteners that pass through cover 36 and into housing 12 or that otherwise attach cover 36 to housing 12. Among many other alternatives, cover 36 would be attached to housing 12 with latches or buckles, including turn buckles, or with hinges and a latch or latches.

Figure 7:
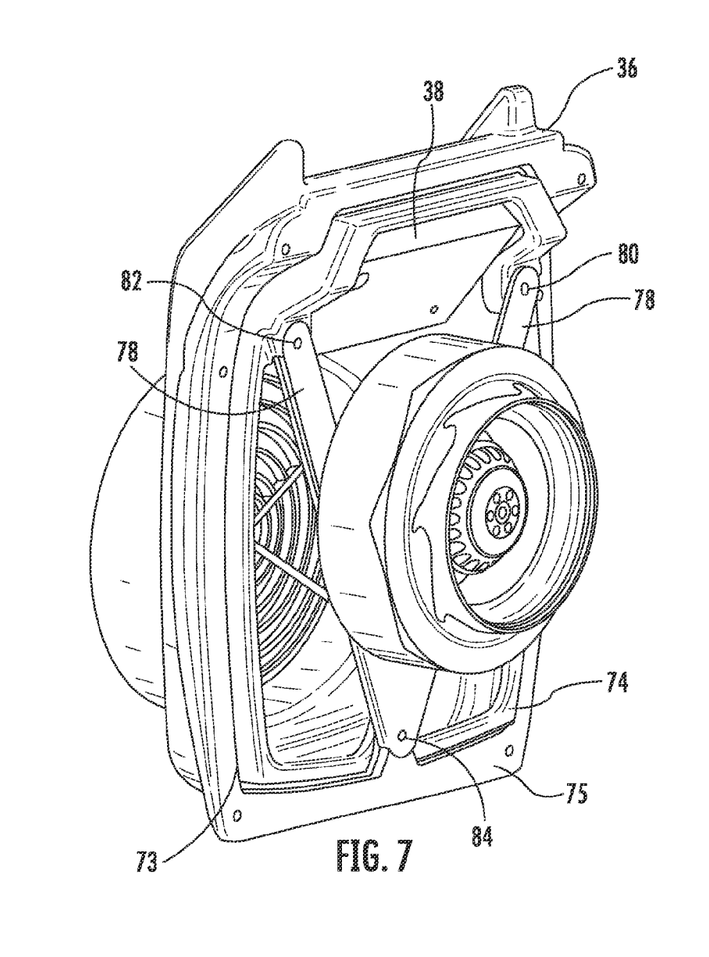
FIGS. 7 and 8 are inside and outside views, respectively, of the outlet cover of the unit depicted in FIG. 1 together with the components that attach to it.
Figure 8:
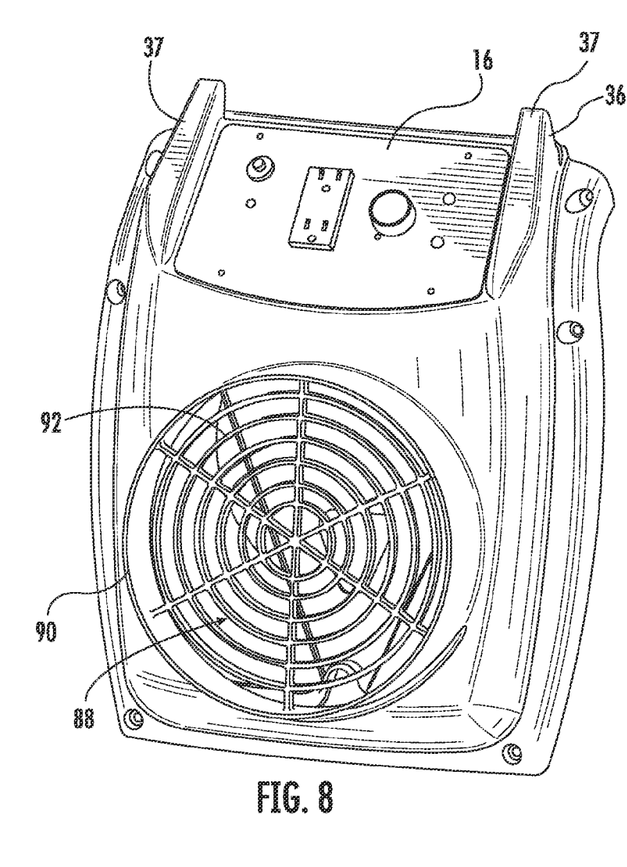

Inside and outside views of outlet cover 36 are provided by FIGS. 7 and 8, respectively. A collar or boss 74 on the inside of outlet cover 36 is sized and shaped to fit snugly inside the outward-facing rim 76 of housing 12. This provides a continuous full perimeter engagement air seal and mechanical engagement between cover 36 and housing 12 that helps support cover 36 and the relatively heavy motorized impeller 32 mounted on cover 36. Air sealing between housing 12 and outlet cover 36 may be facilitated by use of a gasket (such as a closed cell foam gasket) at the intersection 73 of boss 74 and the inner side 75 of outlet cover 36. So positioned gasket material will seal against corner 77 at the rim 76 of housing 12 (see FIG. 6).

As illustrated in FIG. 7, a 3-point mounting bracket 34 has two legs 78 that are attached to separated points 80 and 82 near the top of outlet cover 36 and to the same point 84 near the bottom of outlet cover designed to maximize airflow restriction and designed for mounting more than one size impeller while still allowing adjustment of mounting distance off throat of the venturi. The legs are attached by passing bolts, screws or pins through the legs and into the outlet cover 36 or into threaded or other fasteners attached to outlet cover 36. Other fasteners or fastening methods also can be used. A centrally located mounting plate 86 attaches to each of the legs 78, and the motorized impeller 32 attaches to plate 86. Legs 78 may, but need not, be formed separately from each other, and mounting plate 86 likewise may, but need not, be formed separately from legs 78. Legs 78 and plate 86 may be cast or sheet metal, plastic, reinforced plastic, composite or other appropriate material. Motorized impeller 36 is secured to mounting plate 86, which plate may be configured so that different sizes of motorized impeller 32 may be attached to it and used with the air cleaner of this invention. Additionally, other mounting components may be used with larger or smaller or differently configured motorized impellers.

As is easily seen in FIG. 8, a control panel 16 is attached to the upper portion of cover 36 in a sloping orientation making it easy to see and readily accessible. Panel 16 is mounted between two ribs 37 that protrude from outlet cover 36 above the panel 16 and protect the panel and relatively delicate components on it from inadvertent, damaging contact that might otherwise occur during transportation or use of the unit 10, particularly in building remediation or construction environments of the sort in which air filtration units are used. The panel 16 can carry various components, including switches and other controls, indicator lamps, outlets, power cords and any other appropriate devices. Portions of such devices on the inside of panel 16 are housed within and isolated from cavity 72 by a box 38 that may be a rectilinear box as depicted in the drawings or any other appropriate shape of metal, plastic or other appropriate material.

The lower portion of cover 36 is penetrated by a large round opening 88 providing the air exhaust 18. Attached to the cover 36 around the opening 88 protruding outside the cover 36 is a short cylindrical tube 90 through which filtered air is exhausted. A grill 92 positioned within tube 90 blocks access to the inside of the unit 10, and, in particular, blocks access to the motorized impeller 32.

As is apparent in the figures, the openings in each of the inlet door or cover 30 and the outlet cover 36 are in the same parallel direction front to back with each other and with the opening in baffle wall 66, and with the motorized impeller, facilitating the efficient passage of air through the unit 10.

While numerous manufacturing techniques and materials can be used for the components of the air filtration unit of this invention, there are advantages associated with rotational molding of the housing 12 in medium density polyethylene (MDPE) resin. A double walled rotational molded design results in a housing that is sturdy, light weight, dimensionally consistent, resilient and durable, to which components can be attached, and which can be penetrated by fasteners, without unduly damaging the integrity of the housing or permitting undesired air flow. The interior of such a unit 10 and housing 12 has a generally continuous, smooth surface that facilitates decontamination of the unit 10 after use. Housing 12 may be structurally reinforced and walls may be stiffened by incorporation of structures that provide that function. For instance, housing 12 may include top ribs 13 and side ribs 15. Ribs like top ribs 13 may be received in corresponding recesses 17 (FIG. 3) on the bottom of housing 12 of a unit 10 stacked on top of another like unit, which helps to keep the units stacked in a rough environment like a construction or abatement site and during transport to and from the site. The top horns of cover 36 and exhaust collar 90 may be wrapped with the unit 10 power cord (not shown) for storage of the cord.

The internal air flow has a rotational bias and a non-direct path and one or more deflectors may be used to even out the air flow direction and exit velocity around the exhaust grill face. This may also help correct vortex occurrences in the air flow pattern.

The inlet door 30 and outlet cover 36 may likewise be manufactured of numerous alternative materials and using several different techniques. Injection molding the door 30 and cover 36 components in acrylonitrile butadiene styrene (ABS), polypropylene or MDPE afford doors and covers in the configurations shown in the figures that fit and seat against the housing 12 well to provide needed closure for operation of the unit 10 and easy access to the inside of unit 10 for replacement of filters, decontamination after use and any other reasons.

Feet 94 on the bottom of housing 12 made of rubber or another appropriate resilient material reduce transmission of vibration from the unit 10 to the floor or other surface on which the feet rest and help protect against damage to those surfaces. Feet 94 are located in positions, and the top of housing 12 is configured, so that units 10 can be stacked for transportation, storage or use.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A portable air filtration unit, comprising:
   (a) a molded plastic housing comprising a double wall and defining a cavity communicating with two openings in the housing and dimensioned to hold at least two filters, the housing comprising a front, a back opposite the front, and a bottom extending between the front and the back,
   (b) an inlet cover engageable with the housing and positionable to cover a first of the two housing openings and defining an air inlet opening,
   (c) a removable outlet cover engageable with the housing and positionable to cover a second of the two housing openings from an exterior of the housing and defining an air exhaust opening, the removable outlet cover having an interior side facing the cavity and an exterior side opposite the interior side,
   (d) a bracket attached to and supported by the interior side of the removable outlet cover,
   (e) a motorized air impeller for drawing air into the housing cavity through the inlet cover air inlet opening and forcing the air out through the outlet cover air exhaust opening, the motorized air impeller being attached to the bracket and supported relative to the removable outlet cover by the bracket, and
   (f) a control panel mounted on the outlet cover such that the control panel is separable from the molded plastic housing by removal of the outlet cover from the molded plastic housing;
   wherein the air inlet opening, the motorized air impeller, and the air exhaust opening are in a same direction that is aligned from the back toward the front, thereby facilitating air flow through the unit.

2. The portable air filtration unit of claim 1, wherein each of the inlet cover and outlet cover comprise plastic composite or injection molded plastic.

3. The portable air filtration unit of claim 1, wherein the inlet cover is configured to hold a pre-filter so that air drawn through the inlet cover passes through the pre-filter.

4. The portable air filtration unit of claim 1, wherein an exterior of the housing is defined by an outer wall comprising a smoothness configured to facilitate decontamination of the air filter unit.

5. The portable air filtration unit of claim 1, wherein each of the inlet cover and the outlet cover comprise a protruding boss shape and is oriented to facilitate a snug fit between each cover and the housing when each cover is attached to the housing covering one of the housing openings.

6. The portable air filtration unit of claim 5, further comprising a gasket between at least one of (a) the inlet cover and the housing or (b) the outlet cover and the housing.

7. The portable air filtration unit of claim 1, further comprising:
   a rib on one of a top of the housing or the bottom of the housing, and
   a corresponding recess on the other of the top of the housing or the bottom of the housing, the corresponding recess sized and shaped to receive and mate with the rib such that the top of the housing is shaped to at least one of nest with or receive the bottom of the housing so as to facilitate stacking of one of the air filtration units upon another of the air filtration units.

8. The portable air filtration unit of claim 1, further comprising an ergonomically-designed handle attached to a top of the housing for carrying the unit.

9. The portable air filtration unit of claim 1, wherein the housing comprises a top structure around which a power cord may be wrapped for storage.

10. The portable air filtration unit of claim 1, wherein the housing further comprises an internal wall penetrated by a round opening oriented so as to receive airflow passing from the air inlet opening toward the air exhaust opening.

11. The portable air filtration unit of claim 10, further comprising:
- a recess formed in the housing and facing the cavity; and
- an elongate bracket for securing a final stage high efficiency filter against the internal wall, the elongate bracket comprising a bar seated in the recess and positioned to extend across the cavity so that the elongate bracket secures the final stage high efficiency filter between the internal wall and the elongate bracket.

12. The portable air filtration unit of claim 11, wherein the housing comprises a space for receiving a secondary air filter between the final stage high efficiency filter and the inlet cover.

13. The portable air filtration unit of claim 10, further comprising a venturi ring attached to the housing internal wall proximate the round opening.

14. The portable air filtration unit of claim 13, wherein the housing is adapted to receive at least two alternative sizes of motorized impellers positioned proximate the venturi ring and the outlet cover.

15. The portable air filtration unit of claim 1, wherein the bracket comprises a Y-shaped fixture that attaches to the outlet cover at three attachment points.

16. The portable air filtration unit of claim 1, wherein the bottom of the housing is configured for resting on a floor or other surface to support the portable air filtration unit during use.

17. The portable air filtration unit of claim 1, wherein the bottom of the housing comprises at least one foot for supporting the portable air filtration unit relative to the floor or other surface.

18. A portable air filtration unit, comprising:
(a) a molded plastic housing comprising a double wall and defining a cavity communicating with two openings in the housing and dimensioned to hold at least two filters, the housing comprising a front, a back opposite the front, and a bottom extending between the front and the back,
(b) an inlet cover engageable with the housing and positionable to cover a first of the two housing openings and defining an air inlet opening,
(c) a removable outlet cover engageable with the housing and positionable to cover a second of the two housing openings from an exterior of the housing and defining an air exhaust opening,
(d) a bracket attached to and supported by the removable outlet cover and to which a motorized air impeller is attached for drawing air into the housing cavity through the inlet cover air inlet opening and forcing the air out through the outlet cover air exhaust opening, and
(e) a control panel mounted on the outlet cover such that the control panel is separable from the molded plastic housing by removal of the outlet cover from the molded plastic housing;
wherein the air inlet opening, the at least two filters, the motorized air impeller, and the air exhaust opening are configured to be arranged in series in a same direction that is aligned from the back toward the front, thereby facilitating air flow through the unit in said same direction respectively through the air inlet opening, the at least two filters, the motorized air impeller, and the air exhaust opening, wherein the airflow does not substantially change direction from the air inlet opening to the air exhaust opening.

19. A portable air filtration unit, comprising:
(a) a molded plastic housing comprising a double wall and defining a cavity communicating with two openings in the housing, the housing comprising a front, a back opposite the front, and a bottom extending between the front and the back, wherein the housing further comprises a recess formed in the housing and facing the cavity,
(b) an inlet cover engageable with the housing and positionable to cover a first of the two housing openings and defining an air inlet opening,
(c) a removable outlet cover engageable with the housing and positionable to cover a second of the two housing openings from an exterior of the housing and defining an air exhaust opening, the removable outlet cover having an interior side facing the cavity and an exterior side opposite the interior side,
(d) a pre-filter seated in the inlet cover so that air drawn through the inlet cover passes through the pre-filter, the pre-filter comprising batting material of entangled natural or synthetic fibers,
(e) an internal wall positioned in the housing and penetrated by an opening oriented so as to receive airflow passing from the air inlet opening toward the air exhaust opening,
(f) a final stage high efficiency filter positioned against the internal wall, the final stage high efficiency filter comprising a High Efficiency Particulate Air (HEPA) filter,
(g) an elongate bracket for securing the final stage high efficiency filter against the internal wall, the elongate bracket comprising a bar seated in the recess and positioned to extend across the cavity so that the elongate bracket secures the final stage high efficiency filter between the internal wall and the elongate bracket,
(h) a secondary air filter positioned between the final stage high efficiency filter and the pre-filter, the secondary air filter comprising a filter of synthetic media blend fibers within a rigid or semi-rigid frame;
(i) a mounting bracket attached to and supported by the interior side of the removable outlet cover,
(j) a motorized air impeller for drawing air into the housing cavity through the inlet cover air inlet opening and forcing the air out through the outlet cover air exhaust opening, the motorized air impeller being attached to the mounting bracket and supported relative to the removable outlet cover by the mounting bracket, and
(k) a control panel mounted on the removable outlet cover such that the control panel is separable from the molded plastic housing by removal of the outlet cover from the molded plastic housing;
wherein the air inlet opening, the pre-filter, the secondary air filter, the final stage high efficiency filter, the motorized air impeller, and the air exhaust opening are arranged in series in a same direction that is aligned from the back toward the front of the housing, thereby facilitating air flow through the portable air filtration unit in said same direction respectively through the air inlet opening, the pre-filter, the secondary air filter, the final stage high efficiency filter, the motorized air impeller, and the air exhaust opening, wherein the air flow does not substantially change direction from the air inlet opening to the air exhaust opening.

20. The portable air filtration unit of claim 19, wherein at least one of:
- the mounting bracket comprises a Y-shaped fixture; or
- the opening by which the internal wall is penetrated is a round opening.

* * * * *